United States Patent [19]

Macken

[11] Patent Number: 4,755,999
[45] Date of Patent: Jul. 5, 1988

[54] LASER APPARATUS UTILIZING A MAGNETICALLY ENHANCED ELECTRICAL DISCHARGE

[76] Inventor: John A. Macken, 3755 Wallace Rd., Santa Rosa, Calif. 95480

[21] Appl. No.: 892,782

[22] Filed: Aug. 1, 1986

Related U.S. Application Data

[63] Continuation-in-part of Ser. No. 715,458, Mar. 25, 1985.

[51] Int. Cl.[4] .............................................. H01S 3/00
[52] U.S. Cl. ........................................ 372/37; 372/87; 372/85; 372/33; 372/29; 313/157; 313/161
[58] Field of Search ........................ 372/37, 87, 85, 29, 372/61, 33; 313/157, 161, 231, 41

[56] References Cited

U.S. PATENT DOCUMENTS

3,747,015  7/1973  Buczek .................................. 372/37
4,604,752  8/1986  Sequin et al. ......................... 372/87

OTHER PUBLICATIONS

Buczek et al., "Magnetic Stabilization of the Plasma Column in Flowing Molecular Lasers", Proc. IEEE., vol. 59.

Sequin et al., "High Power Laser Discharge Stabilization with Magnetic Field", Appl. Phys. Lett. 37(2) 15.

*Primary Examiner*—Leon Scott, Jr.
*Attorney, Agent, or Firm*—Edward E. Roberts

[57] ABSTRACT

In laser apparatus, an amplification section of a laser apparatus, including a cavity bounded by first and second opposing surfaces, closely spaced relative to the dimensions of the surfaces, electrodes for generating an electric field within the cavity and magnetic devices for creating a magnetic field in a direction perpendicular to the surfaces, with provision for shaping the electric field so that the electric field is relatively narrow in the dimension parallel to the magnetic field compared to the dimension perpendicular to both the magnetic field vector and the electric field vector established between electrodes within the cavity. The electrodes extend over a distance greater than the spacing between electrodes. An electrical discharge is established with the magnetic field exerting a force on the discharge to move the discharge parallel to the surfaces with the predetermined magnetic field strength causing the discharge to become uniform and stable. One embodiment utilizes two generally planar surfaces to form the cavity, while another embodiment utilizes two concentric cylinders to form the cavity.

43 Claims, 5 Drawing Sheets

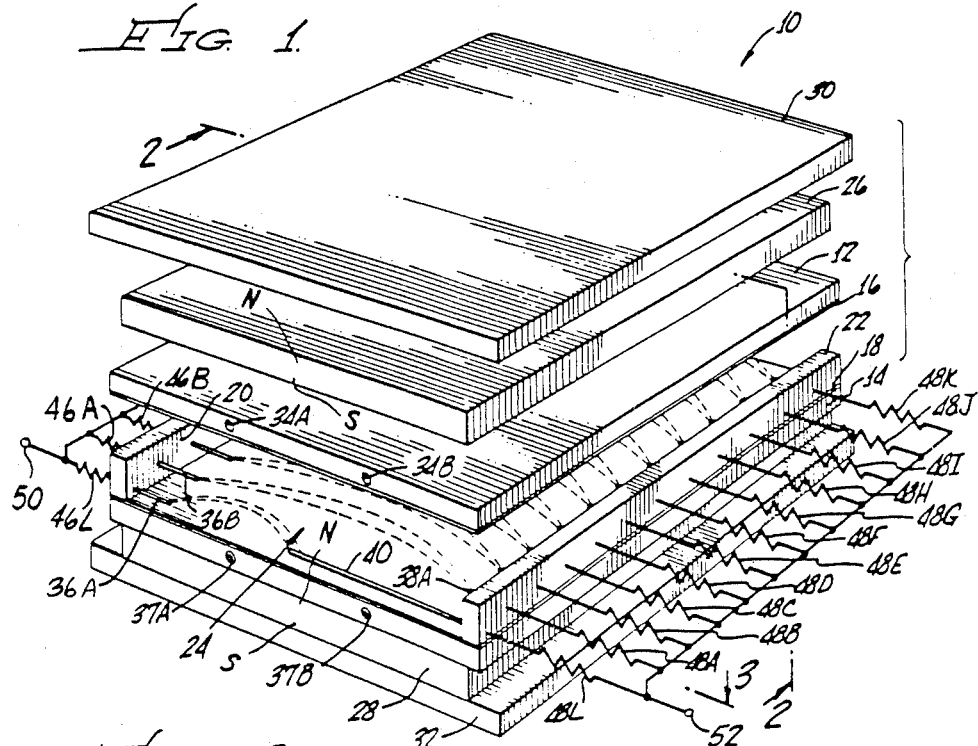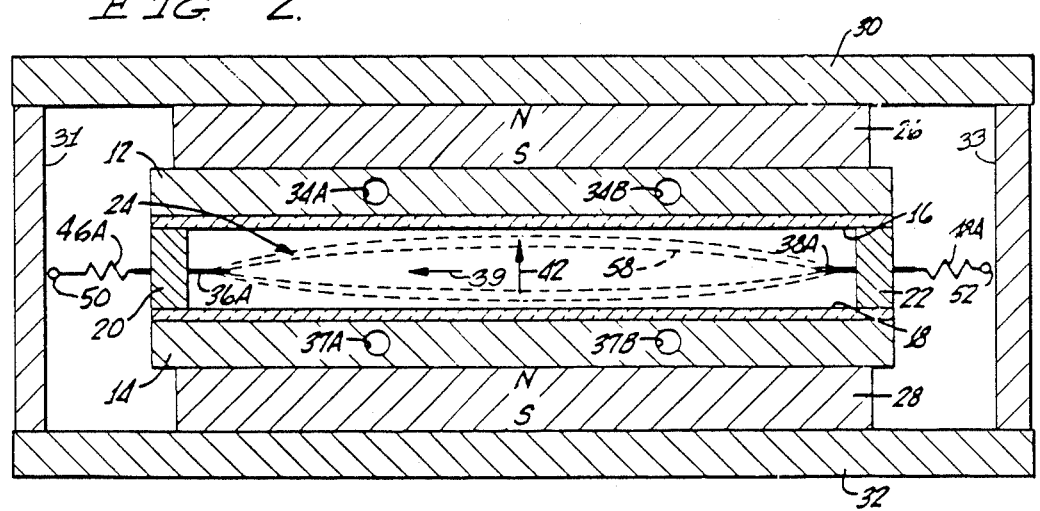

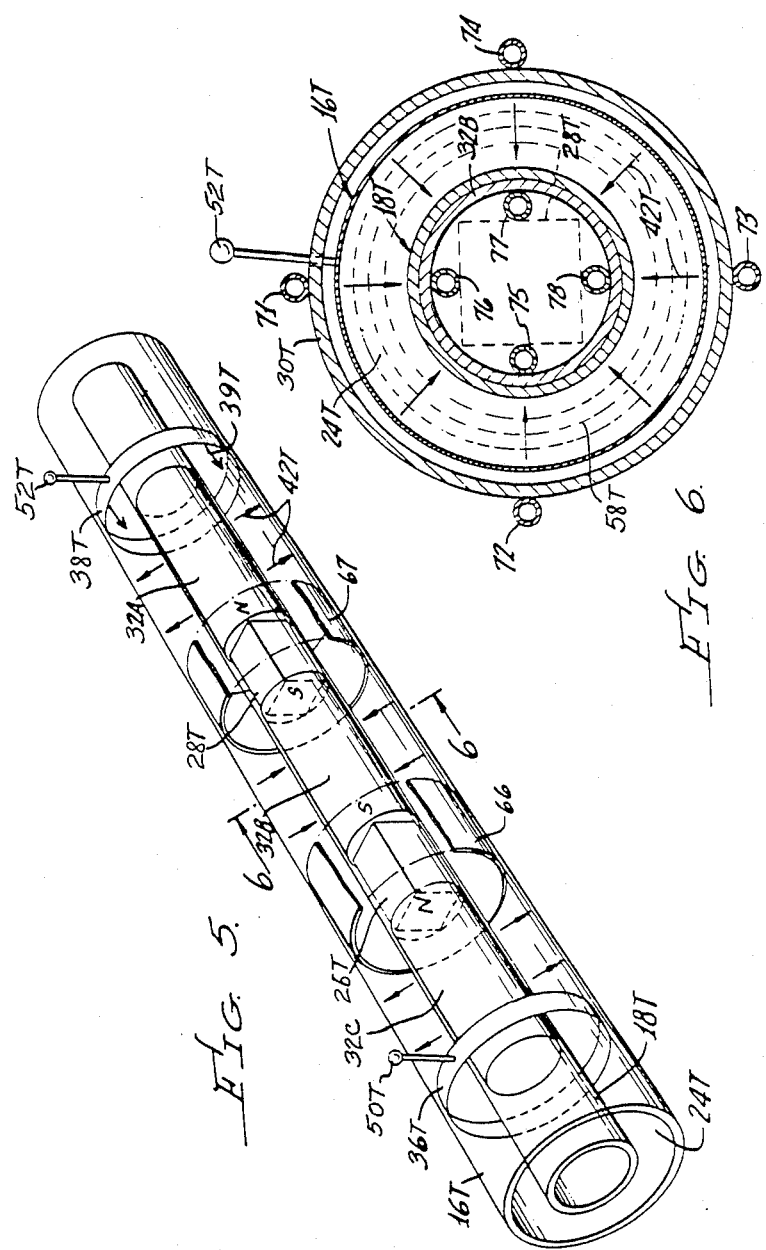

LASER APPARATUS UTILIZING A MAGNETICALLY ENHANCED ELECTRICAL DISCHARGE

CROSS REFERENCE TO RELATED APPLICATION

This application is a continuation-in-part of U.S. Patent Application Ser. No. 715,458, entitled "Laser Apparatus Utilizing A Magnetically Enhanced Electrical Discharge", filed Mar. 25, 1985, by the same inventor.

BACKGROUND OF THE INVENTION

The background of the invention will be discussed in two parts.

FIELD OF THE INVENTION

This invention relates to an apparatus for creating a gaseous discharge, and more particularly to a new type of gaseous discharge structure for use as a laser amplifier section.

DESCRIPTION OF THE PRIOR ART

Possible designs for gas lasers have been severely limited by problems associated with keeping the gaseous discharge stable or with problems filling a given laser cavity uniformly with a gaseous discharge. For example, transverse flow carbon dioxide lasers often exhibit an "arc out" problem where the electrical discharge changes from a glow discharge to an arc. Also, electric discharges can uniformly fill cylindrical tubes, but they do not fill other shapes. Further, lasers which operate in a pulse mode at high gaseous pressures often require a special pre-ionization of the gas to achieve a uniform electrical discharge.

Previously, carbon dioxide lasers have fallen into five different categories. The most common construction is generally known as "slow flow discharge tube." This approach is limited to a maximum power output of about 75 watts per meter. The second category of carbon dioxide laser apparatus is "convective flow" laser apparatus, which achieves an increased output power at the expense of increased complexity. The third category is "gas dynamic" lasers which involve the use of rocket engine technology and, generally, are not suitable for commercial applications. The fourth category, known as "TEA" lasers, is suitable for pulsed laser applications, only. The fifth category is "wave guide" lasers which, at this time, appears to be best suited to applications of less than 100 watts.

In the discussion of different categories of lasers, it should be noted that the primary difference between categories pertains to the construction method used for the laser amplification section. In other words, all common lasers contain various functional component parts, such as the optical system, the electrical power supply, the laser amplification section, etc. However, the greatest difference in design occurs in the method of construction of the laser amplification section, and, therefore, the various categories of lasers are defined by the design approach used in the laser amplification section. For instance, the amplification section can be used as a component of both a laser oscillator and laser amplifier.

For electrically excited gas lasers, the key component in the amplification section is the electrical discharge apparatus. Besides lasers, electrical discharges are key components in other fields. Presented herein is novel electrical discharge apparatus which makes possible a new laser amplification section design. Prior art may be found in the following publications and patents:

(1) U.S. Pat. No. 4,424,646 to applicant herein for "Spiral Flow Convective Laser";

(2) C. J. Buczek, et. al., Applied Physics Letters, Vol. 16 No. 8 (1970);

(3) H. J. J. Sequin, et. al., Applied Physics Letters, Vol. 37, Page 130 (1980);

(4) H. J. J. Sequin, et. al., Applied Physics Letters, Vol. 39, Page 203 (1981);

(5) C. E. Capjack, et. al., Journal of Applied Physics, Vol. 52, Page 4517 (1981);

(6) C.E. Capjack, et. al., Applied Physics, Volume B26, Page 161 (1981);

(7) H.J.J. Sequin, et. al., Applied Optics, Volume 24, No. 9 (1985);

(8) N. Umeda et. al., Applied Optics, 19 442 (1980);

(9) S. Ono et.al., Review of Scientific Instruments, Vol. 54, 1451 (1983);

(10) U.S. Pat. No. 3,435,373;

(11) U.S. Pat. No. 4,077,020.

Prior art 1 and 2 show a magnetic field to stabilize a cylindrical shaped electrical discharge in a transverse flowing gas stream. Prior Art 3, 4, 5, 6, 7 all were written by a group of authors with the University of Alberta in Canada. These articles deal with two different methods of making "magnetically stabilized electrodes." They use crossed electric and magnetic fields in an electric discharge but the discharge exhibited undesirable high power densities and low cooling rates which made it unsuitable for a diffusion cooled laser application. The design differences compared to the invention herein include: (1) orienting the electric field vector perpendicular to the major bounding surfaces; (2) orienting the magnetic field parallel to the major bounding surfaces in the discharge volume; (3) using electrically conductive major bounding surfaces.

Prior Art 8 deals with a "Transverse Zeeman Laser." This class of laser also differs from the invention herein since it has a different cavity shape, objective, electric field configuration and magnetic field configuration. In this laser, the electrical discharge is pressed against the wall of the discharge tube thereby reducing the volume of the discharge. Prior Art 9 describes a small electromagnetic pump in the side arm of the $CO_2$ laser for circulating gas.

In contrast to the prior art, this invention teaches a new method and apparatus for achieving a uniform electrical discharge under conditions which would not be electrically stable or under conditions where the electrical discharge would not evenly fill a desired volume. Further teachings of this invention deal with applying this new type of electrical discharge to the construction of lasers, such as $CO_2$ lasers. When applied to $CO_2$ lasers, the resultant laser represents a new category of $CO_2$ laser, which will have the commercial name "Macken Discharge Laser." The features include a laser apparatus which exhibits increased power output per unit length compared to the slow flow discharge tube laser, but without the necessity of the rapidly flowing gas of convective flow lasers.

SUMMARY OF THE INVENTION

The foregoing and other objects of the invention are accomplished by providing a new type of structure for an electric discharge apparatus which has particular application to the amplification section of a laser apparatus.

This structure includes a cavity which generally is bounded by two facing surfaces, closely spaced relative to the dimensions of the surfaces. A magnetic field is established in a direction generally perpendicular to the surfaces. The electrode design and cavity configuration shape the electric field so that the electric field is relatively narrow in the dimension parallel to the magnetic field compared to the dimension perpendicular to both the magnetic field vector and the electric field vector. The electrodes usually form two elongated electrode regions which extend over a distance considerably longer than the distance separating these two oppositely charged series of electrodes.

When an electrical discharge is established across these elongated regions, the magnetic field exerts a force on the charged particles in the discharge which tends to move the discharge down the length of the electrode regions. Below a certain level of magnetic field strength, this effect exhibits itself as a series of discharges moving down the two elongated electrodes. Above a certain magnetic field strength, the discharge becomes uniform and very stable.

When the discharge is incorporated into a relatively narrow, broad area cavity, then the rate of heat removal from the gas can be greatly increased and it is possible to obtain substantially higher powers per unit length when dealing with thermally limited lasers, such as $CO_2$ lasers. In a first embodiment, two generally planar surfaces are used to form the cavity, while another embodiment utilizes two concentric cylinders to form the cavity.

Other objects, features and advantages of the invention will become apparent from a reading of the specification when taken in conjunction with the drawings, in which like reference numerals refer to like elements in the several view.

BRIEF DESCRIPTION OF THE DRAWINGS

FIG. 1 is an exploded perspective view of the magnetically enhanced laser amplification section of the laser apparatus according to the invention;

FIG. 2 is a cross-sectional view of the assembled laser amplification section of FIG. 1 taken generally along line 2—2 thereof;

FIG. 5 is a cutaway perspective view of an alternate embodiment of a magnetically enhanced laser amplification section which utilizes a closed loop electric discharge;

FIG. 6 is a cross-sectional view of the laser amplification section of FIG. 5, as viewed generally along line 6—6 thereof;

DESCRIPTION OF THE PREFERRED EMBODIMENTS

To provide background on this new type of discharge which can be used in a laser, prior art glow electrical discharges tend to become unstable under many conditions which would be otherwise desirable for the construction of laser amplification sections. With such discharges, at high gaseous pressures or high currents, the discharges tend to form streamers or arcs which are not suitable for proper excitation of the gaseous medium. Therefore, pulsed gas lasers can benefit from this invention.

In accordance with the instant invention, the new type of discharge described herein uniformly distributes across the area between two closely spaced plates, such as rectangular surfaces. With cooling of the plates, the heat removal rate from the gas between these plates is increased generally proportionally to the aspect ratio (width or circumference of cavity divided by plate separation) compared to an equal length gaseous discharge tube.

The ability to attain increased heat removal rates translates directly into higher output powers for thermally limited lasers, such as a $CO_2$ laser. With electrodes simply placed at either end of a structure, bounded by two flat plates, the gas discharge established would not fill the entire volume. Instead, the discharge retains an approximately circular crosssection, the diameter of which is determined by the separation of the two plates, with the discharge having a tendency to wander, thereby further complicating the problem of extracting laser power. If one were to attempt to make a laser utilizing flat plates with no additional sophistication in the discharge, the laser output power would actually be less per meter of length than is achieved by a discharge in a cooled cylindrical tube.

In discussing the preferred embodiments, the examples will be given directed to the construction of a discharge apparatus applied to a new type of carbon dioxide laser amplification section. However, it will become obvious to those skilled in the art that this technology can be applied to other equipment requiring electrical discharges.

Figure 3:
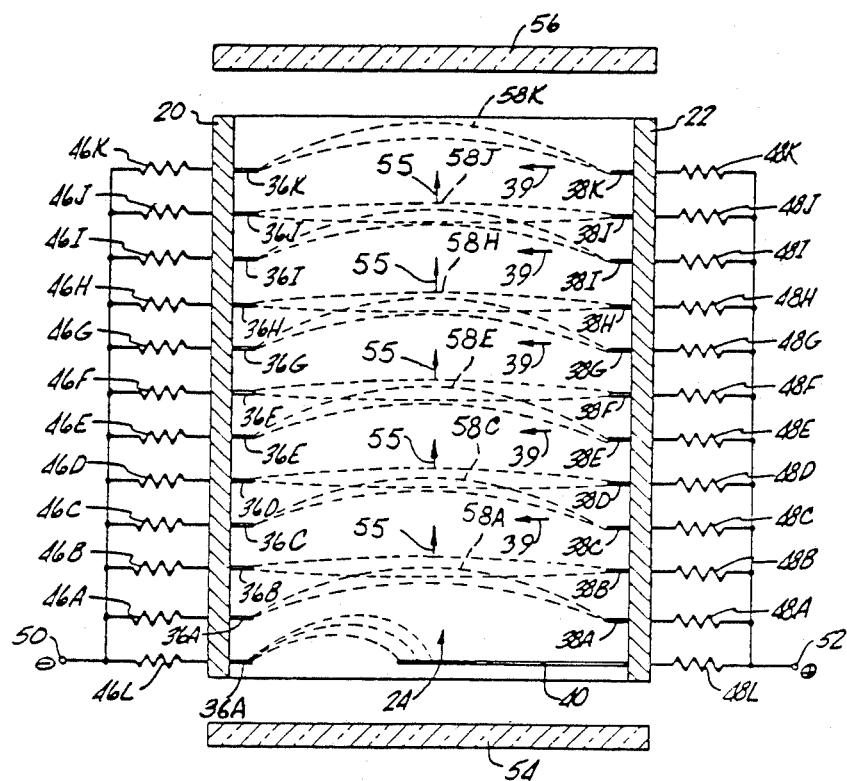
FIG. 3 is a cross-sectional view of the assembled laser amplification section of FIG. 1 taken generally along Line 3—3 thereof, diagrammatically showing flow patterns of the electrical discharge at a magnetic field strength which retains discrete moving discharges.

Referring now to the drawings, and particularly to FIGS. 1 through 3, there is shown a laser amplification section, generally designated 10, of a laser apparatus the section 10 being formed as an envelope, in the form of a generally boxlike rectangular sandwich configuration including two facing surfaces 16 and 18 which are closely spaced relative to their width and length surface dimensions. That is to say that both the width surface dimension and the length surface dimension are greater than the average distance separating surfaces 16 and 18. The surfaces are sufficiently electrically insulating to perform the functions which will be discussed later.

Preferred materials for 16 and 18 would be porcelin, ceramic or glass. Surfaces 16 and 18 are backed by plates 12 and 14 respectively. These plates provide structural support for 16 and 18 and therefore could be made of any suitable structural material including possibly the same material as surface 16 and 18 (such as glass). However, it is desirable for 16 and 18 to also thermally conduct heat, therefore it is more desirable for these plates to be a metal. In the preferred embodiment, plates 16 and 18 are made of a ferromagnetic material such as steel for reasons to be explained later.

The plate-like members 12 and 14 are illustrated as being formed of a material which has an adequately high thermal conductivity, sufficiently thick for formation therein of thermal cooling channels 34A and 34B in plate 12, and channels 37A and 37B in plate 14. Tubes, not shown, would be connected to these cooling channels and a cooling liquid circulated through these openings to cool plates 12 and 14, and ultimately, through thermal conduction, cooling surfaces 16 and 18 which form a major portion of the walls of the cavity 24.

Surfaces 16 and 18 are held apart by supporting members 20 and 22, which are positioned such as to form a generally rectangular cavity 24. While this cavity has two open ends, it is presumed that a vacuum tight envelope can be formed by other members not strictly part of the electric discharge apparatus being described. For example, laser mirrors 54 and 56 shown in FIG. 3 could form part of the vacuum envelope. The volume of cavity 24 is filled with a gas, which in this example is a carbon dioxide, nitrogen and helium mixture.

Suitable magnetic field producing means are provided by permanent magnets 26 and 28. The magnets 26 and 28 are arranged and positioned with the polarity aligned in a direction generally perpendicular to the plane of the plates 12 and 14, that is, as shown in FIGS. 1 and 2, the north pole of the lower magnet 28 abuts the plate 14, while the south pole of the upper magnet 26 abuts the surface of plate 12, these polarities being shown by conventional designations "N" and "S" shown on the magnets 26 and 28. The arrow #42 in FIG. 2 indicates the magnetic field direction.

The magnets 26 and 28 preferably have a size or dimension, approximating the size of dimension of the plate-like members 12 and 14 for easiest magnetic field generation. These magnets 26 and 28 are permanent magnets which may be formed of relatively inexpensive barium iron oxide ceramic magnetic materials or the like. It is to be understood that other devices may be used for generating the required magnetic field such as other permanent magnets, DC electromagnets or AC electromagnets. The objective is to generate a field within cavity 24 with at least a major vector component perpendicular to the surfaces 16 and 18. If the magnetic field produced by the magnets 26 and 28 needs to be made more uniform, it has been found that making plate 12 and 14 from steel helps to make the magnetic field very uniform.

In the preferred embodiment, steel plates 30, 31, 32, 33 (FIG. 2) from a generally rectangular tube and surround the magnets and other parts of the structure. Plates 31 and 33 are not shown in FIGS. 1, 3 and 4 to better illustrate the other components, but plates 30 and 31 are generally the same length as 30. This ferromagnetic tubular structure (shown rectangular, but other shapes can be used) forms a magnetic circuit giving a low magnetic reluctance path for the magnetic lines which emanate from the north pole of 26 and enter the south pole of 28. This magnetic circuit is part of the preferred embodiment, but not absolutely necessary to the function of the invention because the function of the magnetic circuit is to minimize the size and expense of the magnets 26 and 28, as well as confine the magnetic field to structure 10. Eliminating 30, 31, 32 and 33 would require magnets 26 and 28 to be much stronger.

As shown in FIG. 3, it is important to provide a gap between plate 12 and magnetic circuit elements 31 and 33. Similarly, plate 14 should be similarly configured. If these gaps were eliminated, there would be the magnetic equivalent of an electrical "short circuit" and no magnetic field would appear in cavity 24.

The side wall members 20 and 22 are preferably formed of a suitable non-magnetic material. Wall members 20 and 22 should also be electrically insulated from each other. These side wall members maintain the spacing between surfaces 16 and 18, as well as support the electrode structure, which includes first and second sets of electrodes, these sets being generally designated 36 and 38, with electrodes of each set bearing supplementary letter suffix designations, i.e., 36A, 36B, etc.

The set 36 of electrodes are generally parallel, equally spaced cylindrical electrodes (diameters not shown to scale), arranged in parallel with one another, and extending through and supported by, side wall member 20. Similarly electrode set 38 includes electrodes which are generally parallel to one another, in axial alignment with the corresponding one of set 36, the electrode set 38 extending through, and supported by side wall member 22. However, the electrodes do not make electrical contact through side wall members 20 and 22. It is to be understood that other electrode shapes may be substituted.

By reference to FIG. 3, it can be seen that the electrodes of each set 36 and 38 extend into the cavity 24 the same distance, forming an electric field designated 39. Adjacent the lower end of the cavity 24, as viewed in FIG. 3, an auxiliary electrode is provided, having the designation 40, the electrode 40 being representative of single or multiple electrodes used to initiate the electrical discharge. This function will be discussed later.

Electrically, if necessary, electrodes are provided with a suitable ballast device such as resistors, resistors 46A–46L being coupled in series with electrodes 36A–36K, respectively, while resistors 48A–48L are coupled in series with electrodes 38A–38K and 40, respectively. The resistors designated 46 have the other ends thereof coupled together for electrical connection to a terminal 50 of a suitable power source, while resistors designated 48 likewise have the other ends thereof coupled together for electrical connection to the other terminal 52 of the power source. In this illustration, terminal 50 is negatively charged and terminal 52 is positively charged. The electrical and magnetic polarities used are examples only.

It should be emphasized that electrodes 36A–3L and 38A–38L define elongated electrode regions. It may also be possible to replace the multiple linear array of electrodes 36A–36K or 38A–38F with a single electrode, such as a rod made of a suitable electrical conductor. For optimum performance, the rod electrode would be placed so that it approximately passes through the points in space defined by the tips of electrodes 36A–36K thereby extending over the same elongated electrode regions. Similarly, another rod may be able to replace multiple electrodes 38A–38K. These rod electrodes would be connected to the positive and negative terminals of the power source, respectively. It is to be understood that the optimum electrode configuration can be determined experimentally by those skilled in the art.

In FIG. 3, the laser mirrors 54 and 56 are shown adjacent opposite ends of the cavity 24. These mirrors are shown as a point of reference only. Mirrors optimized for this rectangular geometry are beyond the scope of the instant invention. Alternatively, the ends of the cavity 24 could be closed with totally transparent windows positioned at the locations of mirrors 54 and 56. An externally generated laser beam could be passed through the windows to be amplified by the amplifier section 10. In any event, it is to be understood that the cavity 24 is suitably sealed to act as an envelope containing the gas mixture therein.

Referring again to FIG. 3, when a direct current power source is connected to terminals 50 and 52, with terminal 52 being positive, and the direction of the magnetic field generated by magnets 26 and 28 having the poles thereof as shown in FIGS. 1 and 2, the close proximity of electrode 40 to electrode 36A rapidly initiates an electrical discharge at the end of the cavity 24 where the action of the magnetic field requires continuous generation of new discharges. Then when electrical field 39 creates the transverse electrical discharge 58A–58K between the various other electrodes of the first and second sets 36 and 38 of electrodes, the action of the magnetic field is such as to exert a force on the discharge. At least in a selected volume of the cavity where conditions are proper, the action of the magnetic field is to cause these discrete discharges to sweep in the direction indicated by the arrows 55 in FIG. 3. This condition will be named "discrete moving discharges".

At one level of magnetic field strength relative to cavity geometry and gas pressure, the electric discharge visually appears to spread to fill the cavity, but the electrical discharges established between the electrodes will have rapidly moving voids between individual moving discharges, such as depicted in FIGS. 1 and 3. These discrete discharges are designated 58A, 58C, 58E–58K. The discrete moving discharge condition is considered to be partially unstable because of the temporal and spatial current fluctuations. At a magnetic field strength higher than the level depicted in FIG. 3, the discrete discharges merge into one uniform stable discharge, such as depicted in FIG. 4.

Figure 4:
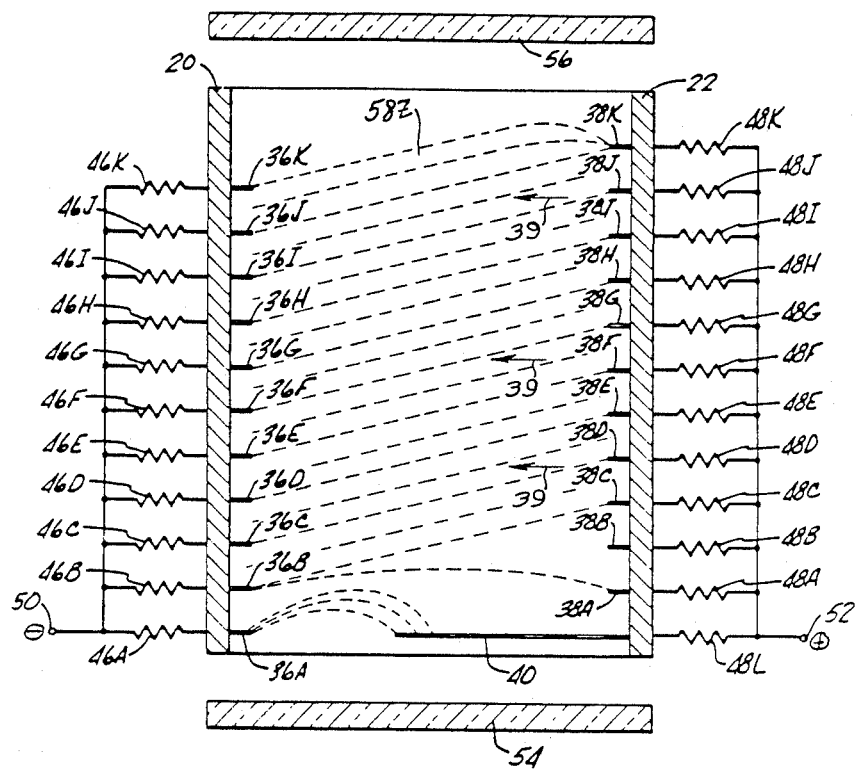
FIG. 4 is a cross-sectional view similar to FIG. 3 which diagrammatically shows the electrical discharge to magnetic field strengths which eliminate discrete discharges and form a Macken discharge.

The dashed lines 58Z in FIG. 4 represent an estimate of the general paths taken by electrons in electric field 39 when this generally uniform discharge condition is achieved. This will be referred to as a "Macken discharge." The general name which includes both the "discrete moving discharge" and the "Macken discharge" is a "sweeping discharge" because in both discharge conditions, the electrons are swept sideways by the action of the magnetic field."It is also usually a characteristic of both types of sweeping discharges to have a discharge dimension (time averaged in the case of the discrete moving discharge) in the sweeping direction (55) which is substantially greater than the orthogonal discharge dimension (the dimension perpendicular to the facing surfaces 16 and 18).

Both of these discharge conditions have been experimentally observed. When there exists a high magnetic field strength which produces rapidly moving discrete discharges, then the speed with which these discharges move depends on the magnetic field strength provided by the magnets 26 and 28, as well as the pressure and composition of the gas mixture within the cavity 24.

For a mixture of gas normally used in carbon dioxide lasers of 17% carbon dioxide, 23% nitrogen and 60% helium, the formula for the speed of the movement of the electrical discharge within the cavity 24 is as shown below:

$$V = 125\, B/P \qquad \text{(Equation 1)}$$

where:

V is the velocity of the discharge in cm/sec,;

B is the strength of the magnetic field in Gauss;

P is the total gas pressure in torr.

By way of illustration, if the gas pressure is 14.2 torr, and the magnetic field strength is 300 gauss, then the speed of transverse motion of the electrical discharges would be 26 meters per second. The above formula is based on measurements where a single discharge moves up stream against a flowing gas. At magnetic field strengths which establish a Macken discharge, experiments have shown that the above formula no longer applies because the leading edge of a discrete discharge moves at a faster rate than the trailing edge. This means that the discharge spreads in width as it travels down the cavity. This appears to provide the mechanism for discrete discharges to merge into one homogeneous discharge.

The magnetic force acts primarily on the electrons in the electrical discharge. This is because the electrons are moving many times faster than the much heavier ionized atoms and molecules. The formula for the force ($F_M$) exerted by a magnetic field of strength B on a particle of charge Q traving with a velocity V is given by the formula:

$$F_M = Q V \times B \qquad \text{(Equation 2)}$$

where:

X is the mathematical notation referred to as "cross."

From this formula, it can be seen that the force is proportional to the velocity V of the charged particles; therefore, since the electrons are traveling more than 100 times faster than the positively charged ions, the primary force exerted by the magnetic field appears on the electrons, and in turn, this force is proportional to the velocity of individual electrons.

At a magnetic field strength where discrete discharges are rapidly moving down the length of the electrodes, a hypothesis predicts there would tend to be a charge distribution across individual discharges where the electrons would tend to congregate near the leading edge of the moving discharge while the positively charged ions tend to be dragged along at the trailing edge of the moving discharge. With increasing magnetic field strength, the hypothesis predicts that the rate of motion of the discharge increases, and the separation between the negatively charged leading edge and the positively charged trailing edge in an individual discharge would increase. Above some magnetic field strength, the electrons at the leading edge of one discharge would bridge the gap between adjacent discharges and catch up with the positively charged ions on the trailing edge of the previous discharge. At this point, the discharges have merged and become homogeneous.

This is the condition depicted in FIG. 4. For manufacturing a high powered $CO_2$ laser, it is desirable that the homogeneous Macken electrical discharge depicted in FIG. 4 be achieved. However, this is not absolutely necessary since the rapidly moving discrete discharges still create a thermal homogeneity in the heating of the gas when the time interval between the passage of individual discharges past a point in space in the cavity 24 is less than the thermal relaxation time of the gas within the cavity 24.

If this condition is reached, then the heat removal rate, and possibly the potential laser output power will be nearly maximized. Therefore, it will not be necessary to obtain further homogenization by causing the individual discharges to merge. However, the unsaturated gain will be much higher when the discharges have merged; therefore, it would be easier to extract the laser power from the excited gas under the conditions where the discharges have merged and formed one continuous discharge.

It is possible to calculate a range of magnetic fields for generating useful sweeping discharges. The lower limit for the required magnetic field to get some beneficial effect is based on the criteria that discrete moving discharges must be moving fast enough that there starts to be some spreading of the heat in the gas. Previously stated Equation 1 gives a general formula for the velocity of moving discharges in a $CO_2$ laser gas.

The thermal time constant T (in seconds) of a $CO_2$, $N_2$, He gas mixture between two parallel plates with separation distance L (in centimeters) at pressure P (in torr) is given by the following simplified and approximate equation:

$$T = 0.0001 \, PL^2 \qquad \text{(Equation 3)}$$

The length of time (t) it takes for a discharge moving at velocity (v) to sweep a distance (d) is:

$$t = d/v \qquad \text{(Equation 4)}$$

If "t", in Equation 4, is set equal to the thermal time constant "T" from Equation 3 and if "d" is set to equal the cavity separation dimension L from Equation 3, then substituting Equation 1 for velocity "v" in Equation 4, the solution to this Equation is: $B = 80/L$ (Equation 5). This shows that for a one centimeter wide cavity, 80 gauss is needed to cause the discharge to sweep a distance equal to the cavity separation distance in one thermal time constant time. This value is independent of pressure.

While 80 gauss will not necessarily produce a uniform thermal heating of the gas, 80 gauss does produce a distinct thermal wake left behind moving discharges for a $CO_2$, $N_2$, He gas mixture. In other, yet untested gases the constants will differ, but also from experiments, 80 gauss is considered to be a good standard for the initiation of the effect. The Macken discharge condition starts at a higher magnetic field which depends on many factors. These factors include: gas pressure, current density, cavity configuration and electrode configuration. The required threshold magnetic field needs to be determined experimentally.

At the opposite extreme, the maximum suitable magnetic field strength can reasonably be set at the saturation flux density of iron which is about 22,000 gauss.

In the first experiment, a cavity similar to that shown in FIG. 1 was constructed, the separation between the tips of the electrodes 36A, 36B, etc., and electrodes 38A, 38B, etc. was 15 centimeters. The length of the elongated region of anodes or cathodes was 45 centimeters and the separation between individual electrodes was 1.25 centimeters. In this experiment, the magnets used were ceramic magnets 9 cm wide, 27 cm long, and 1.25 cm thick. As shown in FIG. 2, two rectangular steel plates (31 and 33) parallel to plates 20 and 22 in FIG. 2 were added to the outside of the structure, magnetically connecting steel plates 30 and 32; thereby increasing the magnetic field strength in the cavity 24.

In this experiment, the gas pressure was initially about 18 torr for a standard laser mix of carbon dioxide, nitrogen and helium which slowly flowed through the cavity. The discharge voltage was 1,800 volts at a current of about 1 amp. The resistors 46 were 20,000 ohms each and resistors 48 were 10,000 ohms each. At a magnetic field strength of 1,500 Gauss, the discharges were found to have completely merged as indicated by monitoring the current across an individual resistor, such as resistor 48E. Also, visual inspection revealed good uniformity. When the magnetic field strength was reduced to 750 Gauss by removing a magnet layer corresponding to magnet 26 in FIG. 1, (forming a structure analogous to FIG. 8), then the discharge was found to still be completely uniform. When all of the magnets were removed, it was found that there was still a residual magnetic field remaining in the steel structure of about 25 Gauss. With the magnetic field strength reduced to 25 Gauss, individual moving discharges were observed both visually and by monitoring the current flow in individual resistors. These discharges were moving as predicted and would cause the current to fluctuate in an individual resistor as a discharge moved past that particular resistor. The separation between discharges was perhaps 10 cm in this experiment.

In this experiment, it was also found that a high magnetic field strength, such as 1,500 Gauss at 18 torr, can exert such a strong force on the electrons that very little current flows to the first few anodes 48A, 48B and 48C because the discharge leaving the first cathode 46A actually travels at an angle dependent on the magnetic field strength and the gas pressure. Increasing the gas pressure to 35 torr or reducing the magnetic field strength to 750 Gauss reduced the angle for the average electron travel relative to the electric field so that the first few anodes began receiving some current.

The concept that the electrons are actually traveling at an angle to the electric field vector 39 is depicted in FIG. 4 by discharge lines 58Z. The magnetic force exerted on the electrons was previously given as $F_M = QV \times B$. It is also well known that the electric field forces $(F_e)$ is given by the following formula:

$$F_e = QE$$

where:
Q = the charge;
E = the electric field strength

Therefore, the ratio of the magnetic field force to the electric field force is given by:

$$F_M/F_e = V \times B/E$$

The velocity of the electrons in electrical discharges has been measured for various conditions. A typical range for the electron drift velocity is from 50,000 M/sec to 15,000 M/sec.

If we assume an average speed of the electrons is 70,000 M/sec, a magnetic field strength of 0.075 weber per square meter (750 Gauss) and an electric field strength in the discharge (ignoring the cathode drop) of 9,200 volt per meter, then substituting into the above formula gives a ratio of the magnetic force to the electric force of about 0.57. This would indicate that the electrons travel at an average angle to the electric field vector of about 30 degrees, but this is only the center of a wide angle distribution. Generally, this type of an effect was observed experimentally and is depicted in FIG. 4.

It was found that it was not necessary to have individual resistive ballast on all of the electrodes as shown in FIGS. 1 through 4. Experiments were conducted where all of the cathode or anode electrodes were connected in parallel. While this tended to concentrate the discharge in the downstream end of the cavity 24, it was stable. Structures have also been tested where either one long rectangular anode bar replaced multiple anodes 38A, 38B, etc., or one long cathode bar replaced multiple cathodes 36A, 36B, etc.

To minimize or eliminate the space between moving discharges, it is important to provide a sufficiently high electric field strength to continuously generating new discharges at the end of the structure which has to "launch" discharges due to the action of the magnetic field. In FIG. 3, the electrode 40 is closer spaced to the oppositely charged electrodes rather than the other electrodes in group 38. This electrode 40 is representative of launcher electrodes. Optional ballast resistor 48L is provided in this electrode. It is also possible to eliminate 40 and to generate the necessary electric field strength to initiate new discharges between electrodes 38A and 36A. To do this, the power supply voltage and the ballast resistor size must be sufficient to initiate a discharge when current stops flowing to anode 38A.

In lieu of DC power, alternating current power may be applied at terminals 50 and 52, in which event it may be necessary to have launcher electrodes similar to electrode 40 at each end of the structure. In lieu of the electrode sets 36 and 38 on the side walls 20 and 22, the electrodes may also be positioned at opposite ends in non-interference with the optics, in which event, the direction of electrical discharges would change by 90 degrees, but electrical discharges would still flow in a direction perpendicular to the applied magnetic field. As another variation, electromagnets may replace the permanent magnets, with multi-phase AC power applied thereto to generate moving magnetic fields.

The above description shown in FIGS. 1 to 4 related to a group of embodiments which can be referred to as "open loop" discharges because the discharge takes place between two electrode regions requiring the initiation of electric discharges at one end of the pair of electrodes and the termination of the discharge at the other end of the electrode pair. Open loop discharges generally have electric field equipotential lines that leave the cavity without closing on themselves. The electric field arrows 39 are the electric field gradient, also known as, the electric field vector. The equipotential lines are perpendicular to the electric field vector.

There is another group of sweeping discharges known as "closed loop discharges" depicted in FIGS. 5 and 6. The closed loop discharges do not need continuous initiation of new discharges. The discharges sweep around a closed loop forming the equivalent of an infinitely long open loop system. The electric field equipotential lines also form closed loops inside the cavity in this type of structure.

Referring now to FIGS. 5 and 6, taken together, there is shown an alternate embodiment in which coaxial, cylindrical geometry is used rather than the planar parallel geometry of FIGS. 1 through 4. In FIGS. 5 and 6, the cylindrical cavity 24T is bounded by two coaxial surfaces 16T and 18T corresponding to surfaces 16 and 18 in FIGS. 1 to 4. Surfaces 16T and 18T are relatively closely spaced compared to the circumference and axial dimensions. Surfaces 16T and 18T are sufficiently electrically insulating so that an electrical discharge would tend to pass through the gas contained in cavity 24T.

Inside surface 18T, there are axially aligned spaced ferromagnetic cylinders 32A, B, C, as shown in FIG. 5. These ferromagnetic cylinders are magnetized by permanent magnets 26T and 28T in axial alignment therewith in the spaces therebetween. The magnets 26T and 28T are positioned with repelling polar orientation as shown at either end of 32B. The magnetic fields (42T) for these magnets are shown in FIG. 5, so that, for example, magnetic cylinder 32B serves as the south pole of the magnet over its length, while cylinders 32A and 32C serve as the north pole of the magnets over the entire length.

In FIG. 5, the outside structure has been omitted for clarity of presentation of the interior details. In FIG. 6, this outside structure is shown. In FIG. 6, cylinder 30T is a ferromagnetic cylinder which runs the length of cylinder 16T except providing appropriate openings for terminals 50T and 52T which are connected to electrodes 36T and 38T in FIG. 5.

Cylinder 30T serves a dual purpose since it forms a part of the magnetic circuit which connects the south poles of the cylinders 32B to the north poles of cylinders 32A and 32C and it also is part of the cooling. The radially extending arrows 42T in FIG. 5 and other unmarked arrows inside the cavity 24T in both FIGS. 5 and 6 indicate the local direction of the magnetic field extending between cylinders 32A, 32B, and 32C and the outside cylinder 30T shown in FIG. 6.

This magnetic field is analogous to magnetic field 42 in FIGS. 1 to 4. Similarly, arrows 39T show the broad area electric field analogous to 39 in FIGS. 2 to 4. Also, cylinder 30T includes four water cooling tubes 71-74, inclusive, which make the thermal contact with this metallic cylinder, these tubes being representative of a cooling method which may be employed for cooling surface 16T. In this case, there would be thermal conduction from the cooled tubes 71-74 through the cylinder 30T and, ultimately, to the surface 16T.

Similarly, the inside metallic cylinders 32A, 32B and 32C are cooled by tubes 75-78 shown in FIG. 6. Once again, for simplicity, these inside cooling tubes are not shown in FIG. 5. This cooling method is just an example of various possible methods of cooling 16T and 18T. In operation, when a voltage is applied to terminals 50T and 52T, a broad area electric field 39T and a relatively broad area electrical discharge 58T (shown in FIG. 6, but not shown in FIG. 5 to better depict the other components) is established through the cavity 24T between electrodes 36T and 38T. These electrodes are analogous to the 36 series and 38 series electrodes, therefore, they can also be segmented and are considered elongated electrode regions.

The radial magnetic fields cause the discharge to rapidly rotate, and if the magnetic field is sufficiently strong, the discharge 58T will form a circle when viewed from the angle shown in FIG. 6. The discharge can become a Macken discharge similar to the process previously described for the parallel geometry described in conjunction with FIG. 4.

It is important to understand that several elements must cooperate to achieve a sweeping discharge. These elements are the cavity shape, the gas, the magnetic field and the electric field associated with a discharge. The description presented herein presumes that the reader starts with a knowledge of the interrelationships of these elements in conventional discharge structures. The following texts are given as reference and are included herein.

(1) M. E. Hirsch, "Gaseous Electronics" Volume 1 1978, Academic Press, New York, (Chapters 1 and 2.)

(2) J.D. Cobine "Gaseous Conductors" 1957, Dover Publications, New York (Chapters 7 and 8).

(3) E. W. McDaniel, "Collision Phenomena in Ionized Gases" 1984, John Wiley and Sons, New York (Pages 506–512).

(4) G. Francis "Ionization Phenomena in Gases" 1960, Academic Press, New York (Pages 123–128).

Of particular interest in reference texts 1 and 2 is the information dealing with the breakdown voltage gradient, the voltage - current curve, and the requirements for stabilizing a convention discharge. References 3 and 4 deal with general effects of a magnetic field on an electrical discharge.

The cooperative feature of these four elements is especially important in achieving a Macken discharge. It is possible to adjust the parameters of some of the elements to compensate for less than ideal conditions on other elements. For example, the cavity shape and the electrodes together control the electric field shape. The electric field shape must at least permit the formation of a broad area sweeping discharge, but ideally, through the use of multiple ballasted electrodes and careful shaping, the electric field should encourage the spreading of the electric discharge. However, inadequacies in this ideal can be offset by increasing the magnetic field strength or an adjustment in the gas composition or pressure.

As shown in FIG. 5, optional thin metallic cylindrical surfaces 66 and 67 are placed in contact with the inside of surface 16T at the positions adjacent magnets 26T and 28T, respectively. These cylinders 66 and 67 serve as electrodes and provide one means for the rotating electric discharges to deal with the anomaly that occurs when the direction of the magnetic field is being reversed, for example, between cylinders 32C and 32B. For example, if the combination of the electric field direction and the magnetic field direction caused the discharge to rotate clockwise in the region near cylinder 32C, then this electrical discharge would terminate on the near surface of electrode 66. The discharge would then re-emerge on the other end of electrode 66 and be rotating counter clockwise as the discharge passed through the region near cylinder 32B. The discharge would then terminate on the near edge of electrode 67 and reappear on the far side of the electrode 67, once more, rotating clockwise and terminating in electrode 38T.

It would, of course, be possible to eliminate or replace internal electrodes 66 and 67 with additional electrodes which were thinner and had external connections similar to those shown on terminals 52T and 50T. It is currently believed that in some cases where there is a reversal in the direction of the magnetic field, such as shown in FIG. 5, between cylinders 32B and 32C, for example, that it is acceptable, but not preferred, to have the electrical discharge pass through this region where the reversal takes place. An experiment has shown that this region tends to cause an instability since there is no magnetic homogenizing of the discharge in this region. Those skilled in the art will recognize that, in the cylindrical geometry, radial magnetic fields are, of necessity, accompanied by periodic reversals in the direction of the magnetic field.

While FIGS. 1–6 show the major design philosophy, there are some variations which are possible. For example, FIGS. 7 and 8 show design variations to the magnetic circuit used in FIG. 2 to supply a magnetic field to a generally rectangular cavity similar to that shown in FIGS. 1–4.

Figure 7:
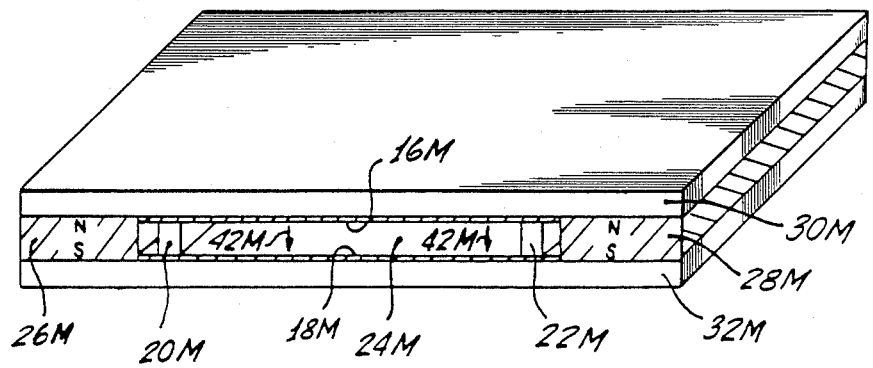
FIG. 7 is a perspective view of another embodiment of a magnetic circuit design which uses interleaved magnets.
Figure 8:
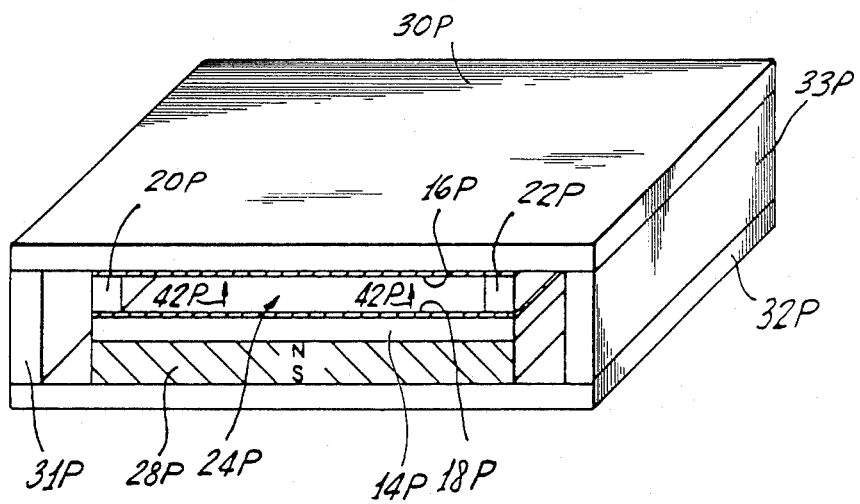
FIG. 8 is a perspective view of another embodiment of a magnetic circuit design which uses a single layer magnet.

FIG. 7 shows only the parts which form the magnetic circuit components of the structure and a few other components needed for clarity. It does not show any of the electrodes, wires, cooling, discharge, etc., which do not form part of the magnetic circuit. In FIG. 7, the numbering corresponds to comparable components in FIGS. 1, 2 and 3 except that the letter "M" is added after the number. Therefore, the cavity 24M is formed between relatively closely spaced facing surfaces 16M and 18M.

Support members 20M and 22M form walls of the cavity. Ferromagnetic (preferably steel) plate 30M performs both the function of plate 30 and 12 in FIG. 2. Similarly, 32M performs the function of 32 and 14 in FIG. 2. Magnets 28M and 26M are placed between ferromagnetic plates 30M and 32M. The ferromagnetic plates transfer the magnetic field generated by said magnets and relatively evenly distributes the magnetic field in cavity 24M with the magnetic field vector shown by 42M. Note that this structure does reverse the direction of the magnetic field vector inside the cavity compared to FIG. 2, even though both figures are depicted with the north pole of the magnet up.

In FIG. 7, the cavity dimension in the direction of the magnetic field vector is shown as being generally the same as the magnet dimension in the magnetized direction. If it is desired to make the magnet thicker or thinner than the cavity, it is possible to either machine plates 30M and 32M to accommodate the height difference or else place the magnets alongside of plates 30M and 32M and use steel plates as magnetic coupling elements to transfer the magnetic field into plates 30M and 32M. These magnetic coupling elements can also have configurations to accommodate orienting the external magnets either perpendicular or parallel to plates 30M and 32M.

FIG. 8 also shows only the elements of the structure related to the magnetic circuit. FIG. 8 is very similar to FIG. 2. The numbering of comparable parts is the same except for the use of the letter "P". The major exceptions are that magnet 26 and plate 12 have been eliminated. The dielectric surface 16P has been placed directly on plate 30P. In FIG. 8, it should be noted that plate 14P could be made of any structurally suitable material, but steel is the preferred material since steel also has the property of making the magnetic field in cavity 24P very uniform. Note that if steel is used for 14P, there is a suitable gap between 14P and 33P or 31P to prevent a magnetic "short circuit." For more information about magnets and magnetic circuits see R. Parker, "Permanent Magnets and Their Applications" 1962, John Wiley & Sons, New York.

The magnetic circuits described in FIGS. 1 to 8 have the same basic elements and purpose. The fundamental purpose is to (1) establish low reluctance path (high permiability) path from between the two poles of a magnet with (ideally) the only gap in the path being the cavity and the non magnetic materials associated with the cavity. (2) To uniformly distribute the magnetic field in the cavity oriented generally perpendicular to the facing surfaces. (3) To establish a sufficiently strong magnetic field in the cavity. To accomplish these objectives, all of the magnetic circuit designs included (1) at least one magnet, (2) a cavity, (3) ferromagnetic pieces backing the relatively closely spaced facing surfaces of the cavity (4) no major magnetic "short circuiting" connection to the ferromagnetic backing pieces which would substantially reduce the magnetic field in the cavity (5) a magnetic circuit design which provides a ferromaganetic return path as needed to complete the magnetic circuit. From the teachings presented here, it is possible to make a variety of magnetic circuits including stacked, multicavity laser structures.

Many other possible configurations which follow the teachings of this invention may be employed. For example, an open cycle cylindrical geometry could be made which would be analogous to wrapping the planar geometry cavity depicted in FIG. 3 into a cylindrical geometry with the cylindrical axis being parallel to the arrows 55 shown on the discharges 58C and 58E. Additionally, another configuration would comprise cylindrical geometry which eliminates magnets 26T and 28T in FIG. 5 by replacing them with cylindrical magnets which would be placed in the space between cylinders 30T and 16T in FIG. 6.

These cylindrical magnets would be radially magnetized with periodically reversed polarity to produce the same type of magnetic field distribution in the cavity as is depicted in FIG. 5 and 6. In order to efficiently form a return path for the magnetic flux, it would be necessary to also replace ferromagnetic cylinders 32A, 32B, and 32C with one continuous ferromagnetic cylinder. There are many other possible magnetic circuit designs based on this philosophy of a continuous central ferromagnetic cylinder and placing the magnets outside of surface 16T. The easiest to explain is to reverse the philosophy depicted in FIGS. 5 and 6 by breaking cylinder 30T into segments with interspaced magnets forming an external analogy to the way magnets 26T and 28T are interspaced between 32A, 32B and 32C.

As previously stated, the apparatus described can be grouped into two classes. The design depicted in FIGS. 5 and 6 is representative of a class called "close loop discharge apparatus." FIGS. 1-4 are respresentative of a class called "open loop discharge apparatus." Several variations on the closed loop discharge exist. For example, it is possible to combine two structures similar to FIG. 7 placed one on top of the other. They would be oriented with the same magnetic polarity on the middle plate between the two cavities and the middle plate would also have a complete dielectric coating. With an external envelope to maintain the partial vacuum, it would be possible for the discharge to form a continuous loop by first sweeping through the top cavity then flipping into the bottom cavity to complete the loop.

Another variation would be an apparatus similar to FIGS. 1-4 where there is a reversal in magnetic field direction in the middle of the cavity along a line parallel to 20. The sweeping direction of the magnetic field would be reversed on either side of this magnetic reversal line. While even though the electric field equipotential lines are open loop, the electrical discharge has some similarities to a closed loop system because of the two opposite sweeping directions. Preliminary experiments indicate this design may have some stability problems.

Various cavity structures have been built and successfully operated as lasers. At least in $CO_2$ lasers tests, lasing has only been achieved when the discharge has either reached the Macken discharge condition depicted in Figure 4 or at least operated under conditions which could be termed a partial transition to this discharge condition. At pressure ranges and current levels commonly used for $CO_2$ lasers, the transition from discrete moving discharges to Macken discharge can be dramatic and sudden.

At magnetic field strengths slightly below transition, the discharge appears smooth to the eye, but current fluctuations can be seen by using an oscilloscope to monitor the current to an individual electrode. This current fluctuation increases in amplitude with increasing distance from the launcher until the fluctuations reach some maximum level. These do not appear to be arcs, but just discrete moving glow discharges. If the gas is a laser gas, below the transition, the discharge excited gas exhibits either no amplification or relatively low amplification.

When the magnetic field is increased in strength to a value above the transition threshold, there is a sudden change in discharge appearance. The light output from the discharge decreases from the previous level, the discharge voltage increases (perhaps 5 to 10I%) and the current fluctuations show a distinct decrease in amplitude with increasing distance from the launcher until some minimum fluctuation level is reached. This is a stable discharge. Most dramatic, for a laser gas, the amplification jumps dramatically usually resulting in a change from non-lasing to lasing when optimum reflectivity mirrors are provided.

The above sharp transition occurs under optimum conditions where other sources of discharge instability are minimized. At less than optimum conditions, there is a transition zone between the two conditions where portions of the discharge can make a partial transition to a Macken discharge or perhaps rapidly flicker between the Macken discharge and the discrete moving discharge conditions. Other sources of instability can even introduce current fluctuations partially masking the transition. Even this transition condition is considered to be generally homogenous having a relatively evenly spaced discharge compared to the discharge distribution at substantially lower magnetic field strengths.

For a laser gas, the clearest definition of the onset of the Macken discharge transition occurs when the laser amplification significantly increases when monitored over a range of magnetic field strengths and from a direction generally parallel to the discharge sweeping direction.

It is now possible to reflect on the conditions working to stabilize the discharge when the Macken discharge condition is reached. The explanation will be given in reference to a rectangular cavity, but it applies equally well to other shapes. The rectangular cavity has three dimensions which will be called (e) parallel to the electric field; (b) parallel to the magnetic field and (s) parallel to the sweeping direction. In this example, (b) is much smaller than (e), and (e) is smaller than (s). For curved cavity shapes, these dimensions can follow cavity contours.

The electric discharge has no problem being stabilized in the (e) direction, as long as some ballasting means are provided to limit the current within the gas. The electric discharge even moves around charged particles creating space charges and local voltage gradients as needed to form a stable condition in the (e) direction. In the (b) direction, the size of the cavity and the pressure of the gas have been chosen to stabilize the discharge. This form of stabilization is commonly referred to as "wall stabilization."

The (s) dimension is chosen to be large. The electric field is usually a fairly uniform potential parallel to the (s) direction. Without any other means of dispersing the discharge in the (s) direction, the discharge will assume a width in the (s) direction roughly equal to the (b) dimension forming a fairly round discharge which will usually wander around in the (s) dimension. The restriction in the size of the discharge in the (s) dimension is believed to be because the heating of the gas lowers the discharge voltage gradient in a narrow channel. This is referred to as thermal confinement of the discharge.

The objective, therefore, is to introduce a new force in the (s) dimension to overcome this thermal confinement. A magenetic field is used to introduce this force on the discharge. For example, it has been calculated that at about 80 gauss for a 1 cm cavity in the (b) direction, the force becomes sufficient to move the discharge through the gas at a rate where the discharge moves one wall separation distance (b) in a time equal to the thermal time constant of the gas. This condition still exhibits thermal confinement, but the effects have been reduced.

At a higher level of magnetic field, the magnetic forces on the discharge exceed the thermal confinement forces and a new stability condition is achieved for the (s) dimension. This new condition permits the discharge to spread to become relatively broad and homogeneous exhibiting a high aspect ratio transverse to the electric field. All three dimensions have been stabilized. While the discharge is generally uniform and homogeneous across its broad area, (s,e), there is a smooth density variation of the discharge in the narrow (b) dimension similar to the effect known in cylindrical discharge tubes.

It is important to realize that this stabilization has been achieved without introducing other sources of discharge instability. It is known that magnetic fields interacting with plasmas can generate several different modes of instability. (SeE G. Francis, "Ionization Phenomena in Gases," 1960 Academic Press Inc., New York [Chapter 7]). The apparant elimination of these problems may, at least in part, be due to the close proximity of the facing surfaces (and ferromagnetic backing plates) to the plasma.

The discussion of philosophy has centered on discharges, but for certain laser applications, such as $CO_2$ and CO lasers, the real objective is to be able to increase the heat removal rate from the discharge heated gas. The cooled, close proximity surfaces performs this task. Some other types of gas lasers which are not thermally limited, depend on the walls to perform a key step in achieving laser gain. Therefore, in laser applications, the facing surfaces and cavity in general, simultaneously perform other duties.

While the preceding discussion has focused on the use of this technology on carbon dioxide lasers, it is to be understood that the techniques and structure shown and described allow design flexibility because it is now possible to force an electrical discharge to fill cavity shapes which previously could not be used. In addition, the homogenizing effect on the discharge may permit applications in high pressure lasers which previously required special ionization procedures.

In most ultra violet lasers, the importance of the heat removal has been largely eliminated, therefore, it is no longer necessary to deal with cavities bounded by a first and second surface. For example, it may be possible to construct a pulsed ultra violet laser with a cylindrical tube which contains two parallel elongated electrode regions extending down the length of the cylinder and generally located near the cylinder walls being opposite each other across the axis of the cylinder. These two elongated electrode regions form a broad area electric field with the magnetic field extending perpendicular to the electric field vector and the length of the cylinder. The pulsed power supply energizing these electrodes could provide the needed electrical excitation.

Lastly, several points of terminology should be defined. The term "two facing surfaces" does not necessarily mean that there has to be a physical break between these surfaces. Also, it is to be understood that the addition of multiple layers or levels of cavities with "two facing surfaces" in each layer or level does not constitute a departure from the invention.

For this invention, the facing surfaces must be sufficiently electrically insulating that an applied voltage parallel to the surfaces produces an electric discharge through the gas. It is known that segmented electrically conductive pieces, can be used for a discharge cavity if they are cut up in short enough lengths and electrically insulated from each other. These pieces are an example of being "effectively electrically insulating" because they are electrically insulating to the electrical discharge.

When it is said that an electric field is "substantially parallel to the facing surfaces," it is understood that the slight transverse voltage gradient near the walls, which is due to electron diffusion to the walls, can be ignored. This effect causes the two facing surfaces to introduce offsetting voltage gradients which average to zero across the full cavity separation distance.

In the range of alternative configurations, it is possible to have two facing surfaces which may not be parallel or evenly spaced. Therefore when making a generalized statement about these surfaces, it is desirable to be able to refer to an imaginary surface half way between the two facing surfaces.

The two facing surfaces can also be described as having "surface dimensions." Rectangular shaped surfaces would have length and width as their surface dimensions. Cylindrical shaped surfaces would have length and circumference as surface dimensions. The term "contour width" can be used to describe the surface dimension orthogonal to length. Therefore, the circumference of a cylinder or the width of a rectangle can both be called contour width. Irregular surface dimensions can be determined by average.

The term "cavity" used throughout this text has the meaning of "a volume which is at least partly enclosed". This should not be confused with "resonant cavity", a common laser term which pertains to the aligned mirrors and the volume between these aligned mirrors.

The term "Macken discharge" used throughout this text describes a discharge which can also be named "a high aspect ratio, generally stable discharge." Similarly, electric fields with characteristics similar to 39 in FIGS. 2, 3 and 4, as well as 39T in FIG. 5 can be named a "high aspect ratio electric field." For both the discharge and the electric field, the phrase "high aspect ratio" refers to the aspect ration transverse to the direction of the electric field.

Grammatically, it is easiest to refer to particular electrodes as cathodes or anodes even when AC current is used. Even though AC electric power alternates polarity of electrodes, at least temporarily, all electrodes can be defined as cathodes or anodes.

In describing the magnetic field requirement, it is preferred that the field is perpendicular to the facing surfaces. However, it is not essential that the magnetic fields be perpendicular to the surfaces as long as the magnetic field has at least a "major vector component" which is perpendicular to the local median. The portion of the magnetic field vector component which is parallel to the median has an undesirable effect and is a waste of magnetic field strength, but it can be tolerated. The term "magnet" is used to denote any source of magnetic field including permanent magnets and electro magnets. The use of permanent magnets in the examples is only an illustration. The term "magnetic circuit" and "short circuit" are both making analogies with electrical circuits.

The use of ballast resistors or "ballast" is to be understood as being representative of any current limiting means, such as ballast tubes, transistors or current limited power supplies. Even a cathode run at current densities called the "abnormal glow" exhibit a type of distributed ballasting. Even a single elongated electrode could conceivably have a resistive layer producing the equivalent effect of multiple ballasted electrodes.

While the preferred embodiments described herein had the proper magnetic, electric and boundary conditions over the vast majority of the cavity, it is possible to restrict the volume of the cavity where the conditions are optimum without departing from this invention. Therefore, it is possible to refer to a "selected portion of the cavity" where the various conditions are proper when describing the invention.

While there have been shown and described preferred embodiments, it is to be understood that various other adaptations and modifications may be made within the spirit and scope of the invention.

I claim:

1. In a method for producing a generally uniform, electric discharge, the steps comprising:
   providing a gaseous filled cavity between two substantially electrically insulating facing surfaces;
   providing a magnetic field oriented in a direction generally orthogonal to said surfaces; and
   providing an electrical field sustaining at least one electrical discharge within said gaseous filled cavity oriented with said electric field generally parallel to said surfaces whereby said magnetic field and said electric field provides that said discharge is generally spread over at least a substantial part of said cavity to form a high aspect ratio, generally stable discharge.

2. The method of claim 1 wherein the step of providing an electric field includes forming two opposed elongated electrode regions using electrically powered electrode means and providing a distributed ballasting means for spreading said electrical discharge over at least a substantial length of said elongated electrode region.

3. The method of claim 2 wherein the step of providing a magnetic field includes positioning said cavity and said electrically insulating facing surfaces between two ferromagnetic metal plates and using at least one magnet, charging said two ferromagnetic metal plates to be opposite magnetic polarities.

4. In an apparatus for producing a discharge comprising:
   an electrical power source;
   a structurally closed envelope containing a cavity;
   a gas within said cavity;
   electrode means within said cavity, said electrode means including cathode electrode means and anode electrode means;
   said electrical power source connected to said cathode electrode means and said anode electrode means such that an electric field and an electric discharge is formed in said cavity, said discharge generally filling a portion of said cavity definable as a discharge volume;
   said cavity being at least partly bound by first and second generally electrically insulating facing surfaces, said facing surfaces have an average separation distance T;
   magnetic means for producing a magnetic field in said cavity between said facing surfaces, said magnetic field oriented generally orthogonal to said facing surfaces, so that said magnetic field generally fills said discharge volume with a magnetic field generally equal to or exceeding a predetermined strength;
   said cathode electrode means and said anode electrode means positioned in said cavity such that said electric field has an orientation generally parallel to said facing surfaces, and said cathode electrode means extends generally parallel to said first facing surface, over a distance which exceeds said distance T;
   whereby said predetermined strength of said magnetic field is magnetic field threshold strength which causes said discharge to spread magnetic field threaded strength which causes said discharge to spread orthogonal to said electric field and parallel to said surfaces thereby forming a sweeping discharge which is a high aspect ratio, generally stable discharge.

5. The apparatus according to claim 4 wherein said first and second facing surfaces each have average dimensions of length and contour width, so that said length and contour width dimensions exceeding said separation distance T, and said anode electrode means and said cathode electrode means are separated, at least in part, by a distance exceeding said distance T.

6. The combination according to claim 5 wherein at least part of said electrode means includes multiple, individually electrically ballasted electrodes.

7. The combination according to claim 6 wherein said electric said defines imaginary equipotential lines, and wherein said anode electrode means and said cathode electrode means are configured and positioned in said cavity so that said equipotential lines generally form closed loops inside said cavity.

8. The combination according to claim 6 wherein said apparatus for producing a discharge is part of a laser device, said gas is a laser gas, said discharge volume exhibits optical gain, said laser device includes aligned mirror means for passing a laser beam through said discharge volume, and including means for cooling at least one of said first and second facing surfaces.

9. The combination according to claim 7 wherein said electric field can be defined as having imaginary equipotential lines, and wherein said anode electrode means and said cathode electrode means are configured and positioned in said cavity so that said equipotential lines generally form open loops inside said cavity.

10. In an apparatus for producing a laser amplification section of a laser device, the improved laser amplification section comprising:
    a cavity being at least partly bounded by two facing surfaces;
    a laser gas disposed within said cavity;

means for establishing a magnetic field inside said cavity, said magnetic field having an orientation such that at least a major vector component of said magnetic field is substantially orthogonal said facing surfaces;

means for establishing an electric field inside said cavity, said electric field having a major vector component which is generally parallel to said facing surfaces, and having a distribution of electric field strength which works with said facing surfaces and said magnetic field to establish within said cavity a sweeping electrical discharge which is spread over a distance substantially greater than the separation of said facing surfaces;

said sweeping discharge excites said laser gas to form an amplifying medium.

11. In an apparatus for producing a laser amplification section of a laser device, the improved laser amplification section comprising;

an envelope containing a cavity;

said cavity being at least partly bounded by two facing surfaces, said two facing surfaces have surface dimensions definable as length and contour width, and being separated by an average distance T which is less than said surface dimensions of length and contour width;

a laser gas disposed within said cavity;

means for establishing a magnetic field inside at least a selected portion of said cavity between said facing surfaces, said magnetic field having an orientation so that at least a major vector component of said magnetic field is perpendicular to an imaginary surface located half way between said facing surfaces;

at least two electrode means within said envelope;

electrical power supply means connected to said electrode means so that said electrode means generates an electric field and a discharge in said cavity, said electrode means are positioned and shaped such that said electric field is oriented generally parallel to said imaginary surface, and said electrode means are positioned and shaped so that said electric field is generally uniformly distributed over at least a major portion of said imaginary surface;

wherein said discharge contains electrically charged particles, and said electrically charged particles in said discharge interact with said shaped electric field and said magnetic field so that said discharge is spread in a direction, along said imaginary surface and transverse to said electric field, over a distance much greater than said average distance, T, separating said facing surfaces.

12. The apparatus according to claim 11 wherein said discharge generates heat in said gas, at least one of said two facing surfaces has cooling means, and said heat in said gas is predominately removed from said gas by thermal conduction through said gas and through said at least one surface to said cooling means.

13. The combination according to claim 12 wherein said electrical power supply means is a generally direct current power supply and said electric field is generally non-reversing polarity.

14. Apparatus according to claim 12 where said electrode means can be defined as anode electrode means and cathode electrode means;

said cathode electrode means includes multiple, individually ballasted electrodes positioned in said cavity to extend generally parallel to said facing surfaces, over a distance exceeding said dimension T;

said anode electrode means also extends over a distance exceeding three times said distance T;

said cathode electrode means and said anode electrode means are separated by a distance which, on the average, exceeds said distance T.

15. The combination according to claim 14 where said two facing surfaces are generally flat and generally parallel.

16. Apparatus according to claim 11 where said magnetic means includes at least one magnet;

said magnetic means also includes at least one ferromagnetic metal plate backing, but not necessarily in contact with, at least one of said facing surfaces;

further at least one of said facing surfaces is made of a material chosen from a group consisting of glass, ceramic, and porcelain.

17. The combination according to claim 16 where said magnetic field is generally uniform over the portion of said cavity containing said discharge.

18. In a laser apparatus including a closed envelope, a laser gas within said envelope, and an aligned laser mirror system, an improved laser amplification section comprising:

a cavity within said enclosed envelope, said cavity at least partly enclosing said gas;

electrode means within said cavity including anode electrode means and cathode electrode means;

said cathode electrode means distributed over an elongated region of said cavity, said elongated cathode electrode region having a length A, said anode electrode means is distributed over an elongated region of said cavity, said elongated anode electrode region having a length B, said elongated cathode electrode means and said elongated anode electrode means are positioned such that a major portion of said elongated cathode means is generally parallel to a major portion of said elongated anode electrode region, said cathode electrode means and said anode electrode means are separated by an average distance "e", said distance "e" is less than said length "A" and said length "B";

at least one of said anode and cathode electrode means includes multiple, electrically ballasted electrodes;

electrical power means connected to said electrode means such that said electrode means establishes within said cavity an electric field and at least one electrical discharge;

magnetic means for establishing a magnetic field within said cavity, said magnetic field being generally perpendicular to both said cathode and anode electrode means, said magnetic field has a strength, at least through said discharge, such that said discharge is spread in said cavity transverse to said electric field, forming a high aspect ratio, generally stable discharge between said electrodes.

19. The apparatus according to claim 18 wherein said discharge contains electrons and ions, and said electrons move through said gas in a general drift direction determined by said electric field and said magnetic field, and wherein said magnetic field exerts a force on said drifting electons causing said drifting electrons to move with a velocity component away from a first launcher end of said elongated electrodes, and wherein said cathode electrode means and said anode electrode means are spaced at said first launcher end so that said electric field has sufficient strength to replace said electrons drifting away from said first launcher end.

20. A laser apparatus comprising:
a structurally closed envelope enclosing a cavity;
a laser gas disposed within said cavity;
first and second effectively electrically insulating surfaces contained within said envelope and at least partially bounding said cavity, said surfaces having average surface dimensions definable as length and contour width, said surfaces oriented to face one another separated by an average distance less than both said length dimension and said contour width dimension of said first and second surfaces;
magnet means for producing a magnetic field generally exceeding a predetermined strength within said cavity oriented generally perpendicular to said surfaces;
power supply means for providing electrical power;
at least two electrodes connected to said power supply, said electrodes contained within said envelope so that when said electrical power is supplied to said electrodes, an electric field and an electric discharge is formed within said cavity;
said electric field has a voltage gradient, said electrically insulating surfaces and said at least two electrodes shape said electric field to be a distributed electric field which exhibits both a high aspect ratio and substantial uniformity transverse to the said electric field voltage gradient, and said shaped electric field and said magnet field cause said discharge to be a high aspect ratio, generally stable discharge;
optical means for directing the path of a laser beam through said discharge.

21. The combination according to claim 20 wherein said facing surfaces are generally cylindrical surfaces which are generally positioned around a common axis, said electrodes have at least one cathode electrode and at least one anode electrode, said cathode and anode electrodes are positioned in said cavity such that said electric field is oriented generally parallel to said axis, and said electric field can also be defined as having imaginary equipotential lines which are generally closed loops around said axis, said magnetic field is generally oriented radially relative to said axis, said magnetic field in said cavity may include different regions of opposite magnetic polarity.

22. The combination according to claim 20 wherein said facing surfaces are generally flat and generally parallel, said electrodes comprise cathode electrode means and anode electrode means, at least one of said cathode electrode means and said anode electrode means includes multiple, individually electrically ballasted electrodes extending over a length of said cavity which is much longer than said average distance separating said facing surfaces.

23. The combination according to claim 22 wherein both said cathode electrode means and said anode electrode means extend over two opposing, generally parallel regions of said cavity, and said two generally parallel electrode regions have both a length and a separation distance which are much larger than said average separation distance;
and wherein said cathode electrode means and said anode electrode means include launcher electrode region where said launcher electrode region shapes said electric field to produce a region of relatively high electric field strength compared to the average of said electric field.

24. Apparatus according to claim 20 wherein said discharge generates heat in said gas, at least one of said first and second surfaces has cooling means, and said heat in said gas is predominately removed from said gas by thermal conduction through said gas and through said surface to said cooling means.

25. A discharge apparatus comprising:
a structurally closed envelope enclosing a cavity;
a gas disposed within said cavity;
a generally direct current electrical power supply producing electrical potential definable as positive and negative polarity;
electrodes disposed within said cavity;
said positive polarity of said electrical power supply connected to at least one of said electrodes forming an anode electrode means;
said negative polarity of said electrical power supply connected to at least one of said electrodes forming a cathode electrode means;
said cathode electrode means and said anode electrode means forming two elongated electrode regions inside said cavity;
at least a major portion of both said elongated cathode and said elongated anode are positioned in said cavity to be generally parallel and generally opposed relationship;
at least said generally parallel lengths of said electrode means define an imaginary plane which passes through said generally parallel lengths;
said direct current electrical power supply connected to said cathode and anode electrode means to form an electric field and a discharge in said cavity, said discharge defining a discharge volume of said cavity;
magnet means for establishing a magnetic field in said cavity;
said magnetic field oriented generally orthogonal to said imaginary plane;
said magnetic field having a strength generally above a predetermined magnetic field strength in said discharge volume of said cavity;
said discharge contains moving electrically charged particles;
said moving electrically charged particles receive a force from said magnetic field, and said force tends to sweep said charged particles with a velocity component parallel to said elongated electrodes thereby depleting said discharge of said charged particles from an end of said discharge;
said electric field has a definable average voltage gradient between said generally parallel electrode means;
means for shaping said electric field such that said end of said discharge which has said depletion of said charged particles has a voltage gradient which is substantially higher than said average definable voltage gradient between said generally parallel electrode means;
said substantially higher voltage gradient causes ionization in said discharge which generally replenishes said charged particles depleted from said end of said discharge.

26. The apparatus according to claim 25 wherein said generally parallel portion of said cathode and said anode electrode means is separated by an average distance "e", said means for establishing said substantially higher voltage gradient is through said elongated cathode means and said elongated anode means being separated by a distance less than "e" near said portion of said discharge undergoing said depletion of electrically charged particles.

27. The apparatus according to claim 25 wherein said cathode electrode means and said anode electrode means, adjacent to said end of said discharge which is depleted of said charged particles, are separated by a distance which is not substantially less than said dimension "e", said electrodes which are part of said generally parallel electrode means are generally maintained at a characteristic electrical potential, and said means for shaping said electric field near said depleted end of said discharge is by the use of at least one individually ballasted electrode being charged to an electric potential which is substantially higher than said characteristic electrical potential of said parallel electrodes.

28. A laser apparatus comprising:
a closed envelope containing first and second generally flat, generally parallel, facing surfaces;
said facing surfaces are generally effectively electrically insulating;
said first and second facing surfaces have average length dimensions $L_1$ and $L_2$ respectively and average width dimensions $W_1$ and $W_2$ respectively;
said facing surfaces are separated by average dimension T;
said dimensions are such that said T dimension is less than $L_1$, $L_2$, $W_1$, and $W_2$ dimensions.
said first surface is backed by, but not necessarily in contact with, first ferromagnetic metal plate;
said second surface is backed by, but not necessarily in contact with, second ferromagnetic metal plate;
said first and second ferromagnetic metal plates are generally parallel through at least the portion of said first and second ferromagnetic plates backing said first and second surfaces;
said facing surfaces, at least in part, bound a structurally closed cavity;
said cavity contains a laser gas;
said cavity also contains at least two electrode means;
an electrical power supply means is connected to said at least two electrode means such that a discharge containing electrically charged particles is formed in, at least a portion of, said cavity between said facing surfaces;
said electrode means are positioned in said cavity such that said electrically charged particles in said discharge have a general drift direction generally parallel to said first and second surfaces;
magnetic means including at least one magnet to establish a magnetic field in said cavity;
said magnetic field in said cavity is generally above a predetermined strength;
said at least one magnet is configured and positioned such that said ferromagnetic metal plates become oppositely magnetically charged thereby broadly distributing said magnetic field in said cavity oriented generally orthogonal to said surfaces; and
optical means for directing a laser beam through said discharge.

29. The apparatus according to claim 28 wherein said magnet has a north magnetic pole and a south magnetic pole;
a part of said first ferromagnetic metal plate is close proximity to said north magnetic pole;
a part of said second ferromagnetic metal plate is in close proximity to said south magnetic pole;
said ferromagnetic metal plates each having a permeability and a thickness sufficient such that said magnetic field is conducted substantially throughout said cavity sufficiently uniformly so that at least between said facing surfaces of said cavity said magnetic field has a strength generally above said predetermined magnetic field strength.

30. The apparatus according to claim 29 wherein said electrically charged particles include electrons and negatively charged ions, further where the said electrons and negative ions each have a general drift direction, and said predetermined magnetic field strength is such that said drift direction for said electrons differs from said drift direction for said negatively charged ions by a substantial angle.

31. The apparatus according to claim 28 wherein said ferromagnetic metal plates are in thermal contact with said electrically insulating surfaces, including liquid cooling means for cooling at least one of said ferromagnetic metal plates, wherein said laser gas is heated by said discharge and said heated gas is predominately cooled by said heat conducting through said gas, said surface, and said ferromagnetic metal to said liquid cooling means.

32. The apparatus according to claim 28 wherein said cavity, said at least one magnet and at least said first ferromagnetic metal plate are generally inside a ferromagnetic metal tubular structure, said ferromagnetic metal tubular structure forms a magnetically conductive path around said cavity and said at least one magnet, and said second ferromagnetic metal plate may be part of said tubular structure.

33. The apparatus according to claim 28 wherein said at least two electrode means form an electric field inside said cavity, said electric field has a voltage gradient, said electrode means and said cavity shape said electric field to form a distributed electric field which is a high aspect ratio electric field and said discharge is a high aspect ratio, generally stable discharge.

34. In a laser apparatus including a closed envelope enclosing a cavity, a gaseous filling within said cavity, the improved feature comprising:
said cavity having first and second facing surfaces which are generally flat surfaces separated by a distance T;
at least most of said first and second facing surfaces are effectively electrically insulating, said first surface is backed by, but not necessarily in contact with, first ferromagnetic metal piece;
said second surface is backed by, but not necessarily in contact with, second ferromagnetic metal piece;
means for producing a magnetic field consisting of at least one magnet exhibiting a north magnetic pole and a south magnetic pole;
said at least one magnet is positioned with said north magnetic pole sufficiently close to at least a portion of said first ferromagnetic metal piece whereby said first ferromagnetic metal piece unit becomes magnetically charged with north magnetic polarity;
said at least one magnet also positioned with said south magnetic pole sufficiently close to at least a portion of said second ferromagnetic metal piece whereby said second ferromagnetic metal piece becomes magnetically charged with south magnetic polarity;

said north magnetically charged ferromagnetic metal piece and said south magnetically charged ferromagnetic metal piece distribute said magnetic field in said cavity oriented generally perpendicular to said facing surfaces;

said magnetic field has a generally uniform strength at least in a substantial portion of said cavity;

electrode means positioned within said cavity;

electrical power means connected to said electrode means such that an electrical discharge containing electrically charged particles is formed in said cavity;

said electrode means are positioned in said cavity such that said charged particles in said discharge generally drift in a direction generally parallel to said facing surfaces; and optical means for directing the path of a laser beam through said discharge.

35. The apparatus according to claim 34 wherein said discharge generates heat in said gas, at least one of said first and second surfaces has cooling means, and said heat in said gas is predominately removed from said gas by thermal conduction through said gas and through said at least one surface to said cooling means.

36. The apparatus according to claim 35 wherein said facing surfaces are generally flat and generally parallel.

37. The apparatus according to claim 34 wherein said electrodes comprise anode electrode means and cathode electrode means, and said cathode electrode means includes multiple, individually ballasted electrodes positioned in said cavity to extend generally parallel to said facing surfaces, over a distance exceeding said dimension T.

38. The apparatus according to claim 37 wherein said anode electrode means also extends over a distance exceeding said distance T, and said cathode electrode means and said anode electrode means are separated by a distance which, on the average, exceeds said distance T.

39. The apparatus according to claim 34 wherein said magnetic field is generally between 80 gauss and 20,000 gauss.

40. A laser apparatus comprising:

a structurally closed envelope member enclosing a cavity;

a laser gas disposed within said cavity;

said cavity is at least partly bounded by two facing, cylindrical surfaces positioned generally coaxially around an axis;

said two facing cylindrical surfaces include an inner surface of circumference A and length B, there is also an outer cylindrical surface of said cavity with circumference C and length L;

said surfaces separated by an average distance T such that said distance T is less than one third said lengths "B" and "L", as well as said circumferance "A";

said two facing cylindrical surfaces are generally effectively electrically insulating;

at least one of said cylindrical surfaces is a least partly backed by, ferromagnetic metal;

magnetic means for generating and distributing a generally radial magnetic field in said cavity oriented generally orthodonal to said cylindrical surfaces;

said magnetic means for generating said magnetic field includes at least one magnet;

said magnetic means for distributing said magnetic field in said cavity includes said ferromagnetic metal backing of said at least one surface;

at least two electrode means in said cavity;

said electrode means includes a cathode electrode region and anode electrode region;

electrical power supply means connected to said electrode means such that an electric field and at least one discharge is formed in said cavity;

said cathode electrode region and anode electrode region are positioned such that said discharge has a length exceeding said diameter "d";

said cathode electrode means and anode electrode means are also positioned such that said electric field is generally parallel to said cylindrical surfaces;

said magnetic field has a strength generally exceeding a predetermined value such that said discharge becomes a high aspect ratio, generally stable discharge; and optical means for directing a laser beam through said discharge.

41. The apparatus according to claim 40 wherein said discharge generates heat in said gas, at least one of said two cylindrical surfaces has cooling means, and said heat in said gas is predominately removed from said gas by thermal conduction through said gas and through said at least one cooled cylindrical surface to said cooling means.

42. The apparatus according to claim 41 wherein said electric field which is generally parallel to said cylindrical surfaces is also generally parallel to said axis.

43. The apparatus according to claim 41 wherein said electric field which is generally parallel to said surfaces is also oriented generally perpendicular to said axis thereby following a curved path around said axis.

* * * * *